United States Patent
Latif et al.

(10) Patent No.: US 11,743,956 B2
(45) Date of Patent: Aug. 29, 2023

(54) METHOD AND DEVICE FOR ENABLING WIRELESS ACCESS TO WIRELESS COMMUNICATION TERMINALS

(71) Applicant: Telefonaktiebolaget LM Ericsson (publ), Stockholm (SE)

(72) Inventors: Sajjadul Latif, Ottawa (CA); Chenguang Lu, Sollentuna (SE); Kim Laraqui, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 19 days.

(21) Appl. No.: 16/072,821

(22) PCT Filed: Feb. 19, 2016

(86) PCT No.: PCT/SE2016/050131
§ 371 (c)(1),
(2) Date: Jul. 25, 2018

(87) PCT Pub. No.: WO2017/142451
PCT Pub. Date: Aug. 24, 2017

(65) Prior Publication Data
US 2019/0037627 A1 Jan. 31, 2019

(51) Int. Cl.
*H04W 76/15* (2018.01)
*H04W 88/10* (2009.01)
(Continued)

(52) U.S. Cl.
CPC ....... *H04W 76/15* (2018.02); *H04W 72/0453* (2013.01); *H04W 88/10* (2013.01);
(Continued)

(58) Field of Classification Search
CPC ..... H04W 76/15; H04W 76/10; H04W 92/02; H04W 92/00; H04W 72/0453;
(Continued)

(56) References Cited

U.S. PATENT DOCUMENTS

2009/0113539 A1* 4/2009 Shu ................. H04L 12/2821
726/12
2010/0296498 A1* 11/2010 Karaoguz ........... H04W 88/10
370/338
(Continued)

FOREIGN PATENT DOCUMENTS

EP 2254382 A2 11/2010
EP 3122154 B1 * 12/2018 ............ H04W 28/08
GB 2495550 A 4/2013

OTHER PUBLICATIONS

International Search Report and Written Opinion for International Patent Application No. PCT/SE2016/050131, dated Oct. 17, 2016, 10 pages.
(Continued)

*Primary Examiner* — Sudesh M Patidar
(74) *Attorney, Agent, or Firm* — Withrow & Terranova, PLLC (57) ABSTRACT

The invention relates to a multi-carrier base station and a method performed at the multi-carrier base station configured to enable wireless access to wireless communication terminals. In an aspect, a device is provided configured to provide wireless communication access to wireless communication terminals. The device comprises a Base Transceiver Station (BTS), configured to be connectable to a core network, a tethering access point, and at least one antenna. The BTS is configured to provide at least a first carrier via the at least one antenna for Third Generation Partnership Project (3GPP) wireless access, and further to provide the tethering access point via a wired connection with at least a second carrier exclusively used by the tethering access point for 3GPP access. Moreover, the tethering access point is configured to provide non-3GPP wireless access via the at least one antenna.

13 Claims, 8 Drawing Sheets (51) Int. Cl.
  *H04W 72/0453* (2023.01)
  *H04W 92/02* (2009.01)
  *H04W 88/04* (2009.01)
  *H04W 84/04* (2009.01)

(52) U.S. Cl.
  CPC .......... *H04W 92/02* (2013.01); *H04W 84/045* (2013.01); *H04W 88/04* (2013.01)

(58) Field of Classification Search
  CPC ... H04W 72/044; H04W 88/10; H04W 88/08; H04W 84/045; H04W 84/042; H04W 88/04; H04W 88/02
  USPC .......................................................... 370/329
  See application file for complete search history.

(56) References Cited

U.S. PATENT DOCUMENTS

| | | | | |
|---|---|---|---|---|
| 2013/0028139 | A1* | 1/2013 | Sanneck | H04L 41/0803 370/254 |
| 2013/0059625 | A1* | 3/2013 | Clegg | H04W 84/105 455/552.1 |
| 2013/0083783 | A1* | 4/2013 | Gupta | H04W 4/70 370/338 |
| 2014/0226736 | A1* | 8/2014 | Niu | H04L 27/2628 375/260 |
| 2015/0282040 | A1 | 10/2015 | Daniel et al. | |
| 2016/0149686 | A1* | 5/2016 | Tsai | H04L 1/1822 370/329 |
| 2018/0295480 | A1 | 10/2018 | Laraqui et al. | |

OTHER PUBLICATIONS

Author Unknown, "Technical Specification Group Radio Access Network; Evolved Universal Terrestrial Radio Access (E-UTRA); Carrier Aggregation; Base Station (BS) radio transmission and reception (Release 10)," Technical Report 36.808, Version 10.1.0, Jul. 2013, 3GPP Organizational Partners, 31 pages.
Author Unknown, "On the Pulse of the Networked Society," Ericsson Mobility Report, Jun. 2015, 28 pages.
Wang, et al., "Carrier Load Balancing and Packet Scheduling for Multi-Carrier Systems," IEEE Transactions on Wireless Communications, vol. 9, Issue 4, Apr. 2010, 10 pages.
Examination Report for European Patent Application No. 16710841.4, dated Dec. 17, 2020, 8 pages.
Summons to Attend Oral Proceedings for European Patent Application No. 16710841.4, dated Feb. 8, 2022, 10 pages.
Intention to Grant for European Patent Application No. 16710841.4, dated Sep. 22, 2022, 5 pages.

* cited by examiner

METHOD AND DEVICE FOR ENABLING WIRELESS ACCESS TO WIRELESS COMMUNICATION TERMINALS

This application is a 35 U.S.C. § 371 national phase filing of International Application No. PCT/SE2016/050131, filed Feb. 19, 2016, the disclosure of which is incorporated herein by reference in its entirety.

TECHNICAL FIELD

The invention relates to a multi-carrier base station and a method performed at the multi-carrier base station configured to enable wireless access to wireless communication terminals.

BACKGROUND

Mobile data traffic has been showing tremendous growth over the last decade and is forecasted to grow even further. Many types of devices are being wirelessly connected to an ever increasing extent, both indoor and outdoor.

Some indoor wireless access technologies have already established quite a presence, such as WiFi and to some extent 3rd Generation Partnership Project (3GPP) based radio access using small cells, e.g. femtocells, which are currently dominant in residential networks. One particular challenge for wireless connections in home environments is that they represent the last mile of any service delivered to end user devices. If that final link is not equipped to handle the required quality, the entire connection (and the service delivered) suffers. Therefore, operators tend to favour robust and simple solutions.

Although WiFi provides greater bandwidth and ability to operate in the unlicensed band, the 3GPP network shows better tolerance to interference and range. However, most household appliances nowadays use WiFi or similar access technologies. One way to improve this is to tether non-3GPP radio access (e.g. WiFi, Bluetooth, ZigBee, etc.) over 3GPP radio access, so as to reduce scalability and control access of the former by using the robust models and infrastructure of the latter.

Figure 1:
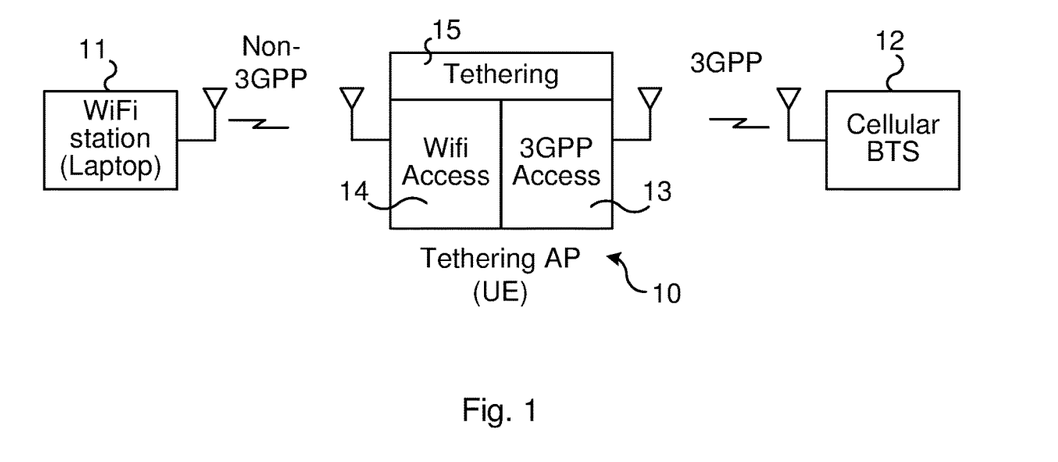
FIG. 1 shows a typical prior art tethering setup.

FIG. 1 shows a typical tethering setup where a UE 10, such as a smart phone or a tablet, is used as an access point (AP) for connecting another UE such as a laptop 11 to a base station (BTS) 12 via the UE 10 and further on to the Internet via a core network. From a functional view, in order to provide tethering, the UE 10 comprises a 3GPP access module 13 for 3GPP communication with the BTS 12, and a non-3GPP access module 14 for non-3GPP communication (in this case WiFi) with the laptop 11.

An appropriate tethering protocol/software 15 runs on the top of the 3GPP access module 13 and the WiFi access module 14 to bridge the two technologies. The UE 10 communicates over the air with the cellular BTS 12 to backhaul the WiFi traffic back of the laptop 11 to the core network and then further to the Internet.

However, it is difficult to tether non-3GPP radio access via 3GPP due to capacity constraints. Studies have shown that it is highly beneficial if the home non-3GPP network (e.g. WiFi) and the home 3GPP network, being for instance a Long-Term Evolution (LTE) network, are managed by one core network, for example since it achieves convergence. The challenge is how to seamlessly manage the home WiFi APs by a standard cellular core.

However, in a cell, there are WiFi users as well as 3GPP users present. If the UE 10 acting as a tethering AP connects to the BTS 12 over the air interface, it will have to share the air interface with other UEs performing 3GPP communication and will further suffer from interference from other adjacent 3GPP cells.

The applicant has proposed an approach to integrate a tethering AP and a cellular BTS in one device, which is referred to as a residential small cell (RSC), in order to overcome these problems. However, this approach does not address a situation where the BTS is a multi-carrier BTS.

SUMMARY

An object of the present invention is to solve, or at least mitigate, this problem in the art and to provide an improved method performed by a base station for enabling wireless access to wireless communication terminals. This object is attained in a first aspect of the invention by a method performed at a multi-carrier base station configured to enable wireless access to wireless communication terminals. The method comprises providing a first set of the wireless communication terminals with at least a first carrier for 3GPP wireless access, and providing a tethering access point via a wired connection with at least a second carrier exclusively used by the tethering access point for 3GPP access, the tethering access point being configured to act as a non-3GPP wireless access point for a second set of the wireless communication terminals.

This object is attained in a second aspect of the invention by a device configured to provide wireless communication access to wireless communication terminals. The device comprises a base transceiver station (BTS), configured to be connectable to a core network, a tethering access point (AP), and at least one antenna. The BTS is configured to provide at least a first carrier via the at least one antenna for 3GPP wireless access, and further to provide the tethering AP via a wired connection with at least a second carrier exclusively used by the tethering AP for 3GPP access. Moreover, the tethering AP is configured to provide non-3GPP wireless access via the at least one antenna.

Thus, a device referred to herein as a multi carrier base-station (MCBS) is provided for enabling wireless access to wireless communication terminals. The MCBS comprises a BTS being integrated with a tethering AP serving as a non-3GPP wireless access point for selected terminals, possibly as single device accommodated within the same housing, or even integrated on a single chip.

The non-3GPP access includes e.g. WiFi, Bluetooth, ZigBee, WiMAX, ("Worldwide Interoperability for Microwave Access", CDMA2000 ("Code Division Multiple Access"), etc., but will in the following be exemplified as a WiFi access.

The BTS typically connects to the core network via broadband provided over e.g. Digital Subscriber Line (DSL) or cable by means of a fixed access modem followed by a Digital Signal Processor (DSP) for processing the incoming baseband signals before being shifted to radio frequency (RF) by a radio frequency front end (RF-FE) module.

The BTS provides at least a first carrier to a first set of the wireless communication terminals, i.e. to at least one of the terminals, for regular 3GPP access to provide 3GPP communication via the core network.

Further, the multi-carrier capability of the BTS is advantageously utilized by providing at least a second carrier to the tethering AP being configured to act as a non-3GPP wireless access point to a second set of the wireless communication terminals, i.e. to at least another one of the terminals.

The second carrier is transferred via a wired connection to the tethering AP, and is exclusively used by the tethering AP for 3GPP access.

The MCBS is equipped with one or more antennas for providing wireless access to the communication terminals. From the perspective of the BTS, the tethering AP is perceived as a regular communication terminal with the second carrier being transferred via wired connection to, and terminated at, the tethering AP (i.e. without passing over any air interface).

The tethering AP will thus provide WiFi access to one or more communication terminals, and the second carrier is advantageously configured to carry core network backhaul signalling for the WiFi (i.e. non-3GPP) access to/from the core network.

With this arrangement, the WiFi access of the second set of terminals is transparent to the BTS and the core network, as the BTS and the core network perceives the tethering AP as a regular communication terminal.

With this embodiment, by assigning the tethering AP with a specific carrier set for WiFi backhauling, tethering-based WiFi backhauling is advantageously realized in an integrated MCBS design and made transparent to the operations of the BTS and the core network.

In an embodiment, the RF-FE module provides both the first and second carrier at RF to the first set of terminals and to the tethering AP, respectively.

In a further embodiment, the second carrier is instead provided to the tethering AP at baseband from the DSP.

In still another embodiment, the tethering AP comprises a 3GPP access module configured to receive said at least a second carrier, a non-3GPP access module configured to provide non-3GPP wireless access to the second set of wireless communication terminals via the at least one antenna, and a tethering module configured to provide connectivity between the 3GPP access module and the a non-3GPP access module for tethering the second set of wireless communication terminals to the tethering AP.

In embodiments, at least the 3GPP access module of the tethering AP is implemented within the DSP. It is envisaged that also the non-3GPP access module and the tethering module may be implemented within the DSP.

In still a further embodiment, the tethering AP is configured to receive said at least one first carrier for 3GPP access, wherein at least part of capacity of the at least one first carrier is shared between the tethering access point and the first set of the wireless communication terminals. This is highly advantageous for load balancing.

In yet another embodiment, the MCBS further comprises a power amplifier arranged in a transmit path configured to amplify signals to the first set of wireless communication terminals, and a low noise amplifier arranged in a receive path configured to amplify signals from the first set of wireless communication terminals.

Further provided is a computer program comprising computer-executable instructions for causing the device to perform steps according to an embodiment of the invention, when the computer-executable instructions are executed on a processing unit included in the device.

Also provided is a computer program product comprising a computer readable medium, the computer readable medium having the computer program embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 has previously been discussed and shows a typical prior art tethering setup where a UE 10, such as a smart phone or a tablet, is used as a tethering AP for connecting another UE such as a laptop 11 to a BTS 12 via the UE 10 and further on to the Internet via a core network.

Figure 2:
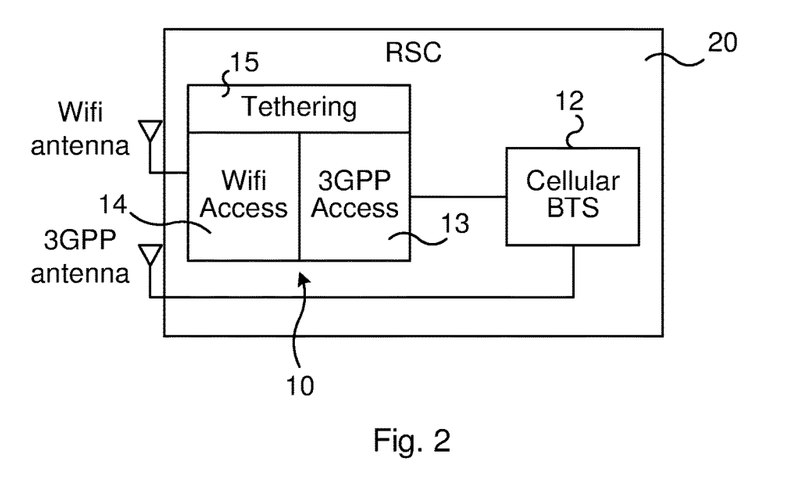
FIG. 2 shows an approach proposed by the applicant to integrate a tethering AP and a cellular BTS in one device.

FIG. 2 shows an approach proposed by the applicant to integrate a tethering AP 10 and a cellular BTS 12 in one device, which is referred to as a residential small cell (RSC) 20, in order to overcome the problems of the art as discussed with reference to FIG. 1. As previously discussed, the tethering AP 10 (replacing the UE of FIG. 1) comprises a 3GPP access module 13 for 3GPP communication with the BTS 12, and a non-3GPP access module 14 for non-3GPP communication (such as WiFi).

An appropriate tethering protocol/software 15 runs on the top of the 3GPP access module 13 and the WiFi access module 14 to bridge the two technologies.

A single antenna may be shared by WiFi and 3GPP, in particular when the 3GPP radio frequency band is close to the WiFi band. In the single-device design of FIG. 2, all components are typically mounted on the same printed circuit board (PCB) for efficient integration. However, this approach does not address a situation where the BTS 20 is a multi-carrier BTS.

Residential indoor networks play an important role in overall data growth, and will most likely be even more important in the future. Ongoing research is considering:

optimizing residential broadband access systems so that these focus primarily on wireless last mile access, and treat wireline services as an exception, and as part of this optimization, it is important to not increase the level of complexity to an infeasible level. For example, a wireless residential environment will need to support many standards (WiFi, 3GPP, Bluetooth, ZigBee, and others) in order to serve as many wireless devices as possible via radio access. Yet, this also requires network complexity to be retained at a feasible level so as not to make the entire end-to-end solution unwieldy. One way of doing this is to tether the non-3GPP radio accesses over 3GPP, thereby in a way "transforming" from one cumbersome radio access to another well-known radio access.

Further, to meet the demand for higher bit rate, carrier aggregation (CA) techniques have been standardized in 3GPP release 10 and has been deployed in the field. Basically, multiple carriers (up to 5 are currently specified in 3GPP) can be aggregated as one data pipe to serve one UE. The base station schedules the UE traffic over all available carriers together with all other UEs. For example, with two carriers of 20 MHz, peak rates of 300 Mbps can be reached with 2×2 MIMO ("multiple-input and multiple-output").

No existing solutions have been found to achieve the RSC functionality required, which utilizes the LTE bearers for WiFi backhauling.

It is challenging to integrate the tethering AP 10 device along with the BTS 12 inside the RSC 20 to provide a single-device solution. One approach would be to provide a completely new design which implements the tethering AP 10 (and its functional entities in the form of the WiFi access module 14, the 3GPP access module 13, and the tethering SW 15) in hardware, e.g. in a Digital Signal Processor (DSP) of the RSC 20. Such a solution will be shown in the following, but is relatively complex and expensive, as RBS hardware must be modified and new software must be implemented.

Hence, it is desirable to find a solution which manages to maximize reuse of the existing components and at the same time achieve transparency for the BTS and the core network.

Figure 3:
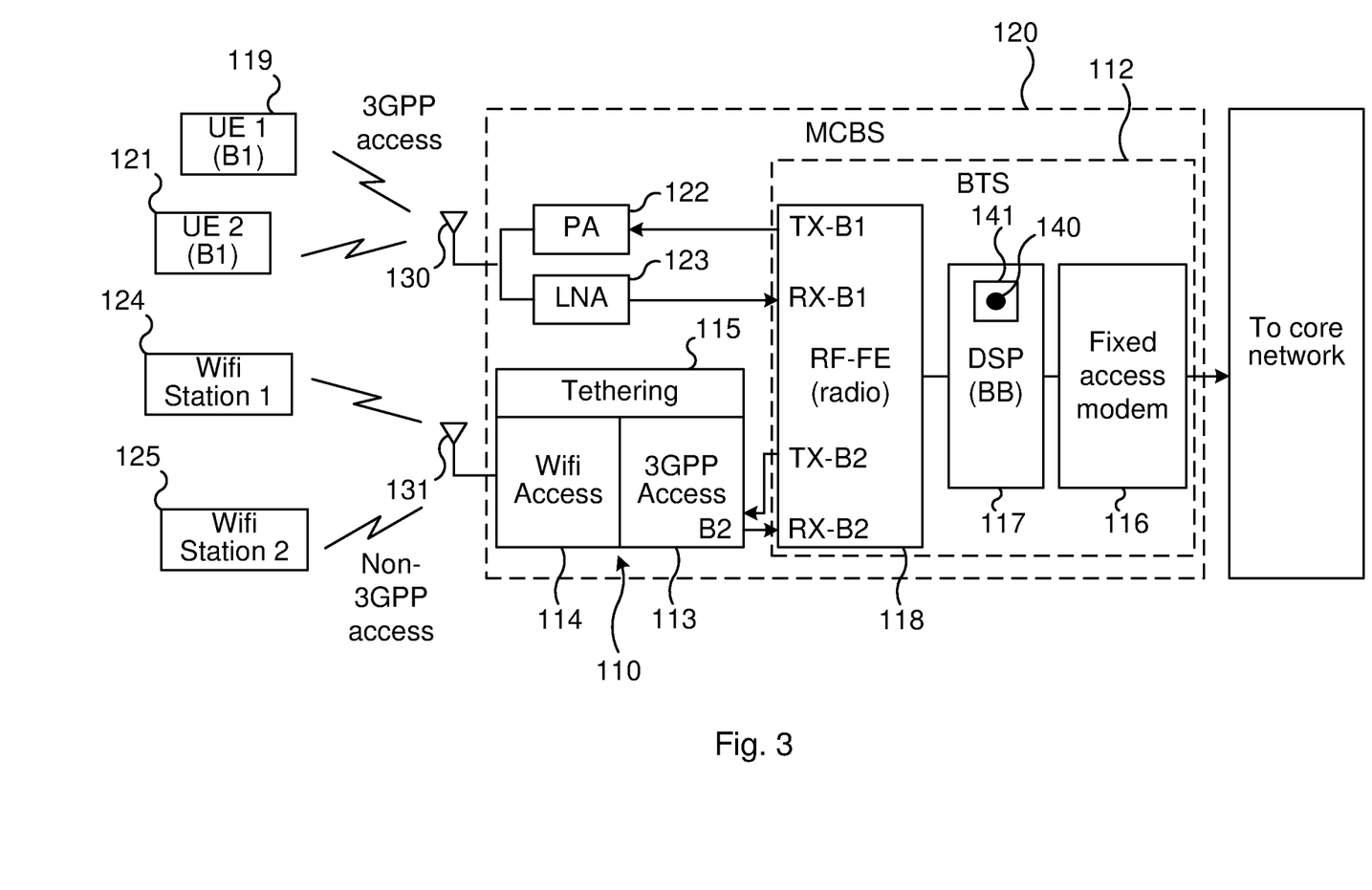
FIG. 3 illustrates a BTS according to an embodiment of the invention being integrated within an RSC with a tethering AP serving as a non-3GPP wireless access point for mobile terminals.

FIG. 3 illustrates a multi carrier base-station (MCBS) 120 according to an embodiment of the invention comprising a BTS 112 being integrated with a tethering AP 110 serving as a non-3GPP wireless access point for selected terminals, possibly as single device accommodated within the same housing, or even integrated on a single chip.

The non-3GPP access includes e.g. WiFi, Bluetooth, ZigBee, WiMAX, ("Worldwide Interoperability for Microwave Access", CDMA2000 ("Code Division Multiple Access"), etc., but will in the following be exemplified as a WiFi access.

The MCBS 120 typically connects to the core network via broadband provided over e.g. Digital Subscriber Line (DSL) or cable. In case the MCBS 120 connects to an LTE network, the core network is referred to as an Evolved Packet Core (EPC). The interface to the core network is embodied in the form of a fixed access modem 116. The fixed access modem 116 is generally followed by a Digital Signal Processor (DSP) 117 for processing the incoming baseband (BB) signals before being shifted to radio frequency (RF) by the radio frequency front end (RF-FE) module 118.

Now, in this embodiment, the BTS 112 provides a first carrier in a first band B1 to first UE 119 and second UE 120 (being for instance smart phones) for regular 3GPP access to provide 3GPP communication via the core network. Generally, a power amplifier (PA) 122 is used in a transmit (TX) path of the first band B1, while a low noise amplifier (LNA) 123 is used in a receive (RX) path of the first band B1.

Further, the multi-carrier capability of the BTS 112 is advantageously utilized by providing a second carrier in a second band B2 to the tethering AP 110 being configured to act as a non-3GPP wireless access point, in this example WiFi, for first WiFi terminal 124 and second WiFi terminal 125 (being for instance tablets). The second carrier is transferred via a wired connection to the tethering AP, and is exclusively used by the tethering AP 110 for 3GPP access.

In this example, a first antenna 130 is utilized for providing 3GPP wireless access, while a second antenna 131 is utilized for providing non-3GPP wireless access, even though it may be envisaged that a single antenna is used for both 3GPP and non-3GPP wireless access.

It should be noted that the first and the second carrier, and possibly any further carrier, may be provided in the same band. Two separate bands are used for illustrational purposes. In case multiple carriers are provided in the same band, the RF-FE 118 would only have to comprise one TX interface and one RX interface. Further, if the second carrier is going to be used exclusively by the tethering AP 112 for backhauling WiFi signalling of the terminals 124 and 125, any broadcasted power of the second carrier at the PA output must be neglectably low (in particular if the operator has no license for the second carrier). If necessary, this can be achieved by filtering out the second carrier before it reaches the PA 122.

From the perspective of the BTS 112, the tethering AP 110, comprising a 3GPP access module 113, a WiFi access module 114, and tethering SW 115 to bridge the two access modules 114, 115, is perceived as a regular UE, with the second carrier in the second band B2 being transferred via wired connection to, and terminated at, the 3GPP access module 113 (i.e. without passing over any air interface). Hence, from the perspective of the BTS 112, there is no difference between UE1 119, UE2 121 and the tethering AP 110.

The tethering AP 110 will thus provide WiFi access to first and second WiFi terminals 124, 125 via WiFi access module 114, and the carrier of the second band B2 is advantageously configured to carry core network backhaul signalling for the WiFi access to/from the core network. In practice, in case of LTE, the WiFi backhaul signalling is carried over the EPC network to a Packet Data Network Gateway (PDN GW) and further on to a PDN, typically the Internet.

With this arrangement, the WiFi access of the WiFi terminals 124, 125 are transparent to the BTS 112 and the core network, as the BTS 112 perceives the tethering AP 110 as a UE. When establishing a connection with the core network, the tethering AP 110 is viewed upon as just another LTE UE from the perspective of the BTS 112 and the core network. Subscription information is collected from a Subscriber Identity Module/Universal Subscriber Identity Module (SIM/USIM) associated with the tethering AP 110 (and arranged within the MCBS 120). The PDN GW acquires the subscription information, provisions the connection and registers the device. A scheduler/aggregator of the BTS 112 then assigns a default bearer service to the tethering AP 110.

Preferably, the MCBS 120 is a single-device solution advantageously accommodating the BTS 112, the tethering AP 110 the PA 122 and the LNA 123 in the same housing, or even on the same printed circuit board.

With this embodiment, by assigning the tethering AP 110 with a specific carrier set for WiFi backhauling, tethering-based WiFi backhauling is advantageously realized in an integrated MCBS design and made transparent to the operations of the BTS 112 and the core network. As a consequence, no changes are required in e.g. protocol stack implementations regarding the 3GPP access, WiFi access and the bridging tethering SW, and thus reuse of the existing architecture both in terms of HW and SW is facilitated.

In the two-carrier example of FIG. 3, the BTS 112 supports two carriers and inter-band CA. One carrier, i.e. the carrier in the second band B2, is exclusively assigned to the tethering AP 110 for WiFi backhauling only, i.e. it is not carried over the air interface via the antennas 130 and/or 131 but transferred via wired connection to the tethering AP 110, even if the operator has no license for using the carrier. The other carrier, i.e. the carrier in the first band B1, is assigned to the normal LTE UEs.

The MCBS 120 typically comprises a processing unit embodied in the form of one or more microprocessors, such as the DSP 117, arranged to execute a computer program 140 downloaded to a suitable storage medium 141 associated with the microprocessor, such as a Random Access Memory (RAM), a Flash memory or a hard disk drive for controlling various functionality of the MCBS 120. The processing unit 117 is arranged to cause the node MCBS 120 to carry out a method according to an embodiment of the invention, as will be described subsequently, when the appropriate computer program 140 comprising computer-executable instructions is executed by the processing unit 141. The storage medium 141 may also be a computer program product comprising the computer program 140. Alternatively, the computer program 140 may be transferred to the storage medium 141 by means of a suitable computer program product, such as a Digital Versatile Disc (DVD) or a memory stick. As a further alternative, the computer program 140 may be downloaded to the storage medium 141 over a network. The processing unit 117 may alternatively be embodied in the form of an application specific integrated circuit (ASIC), a field-programmable gate array (FPGA), a complex programmable logic device (CPLD), etc.

Figure 4:
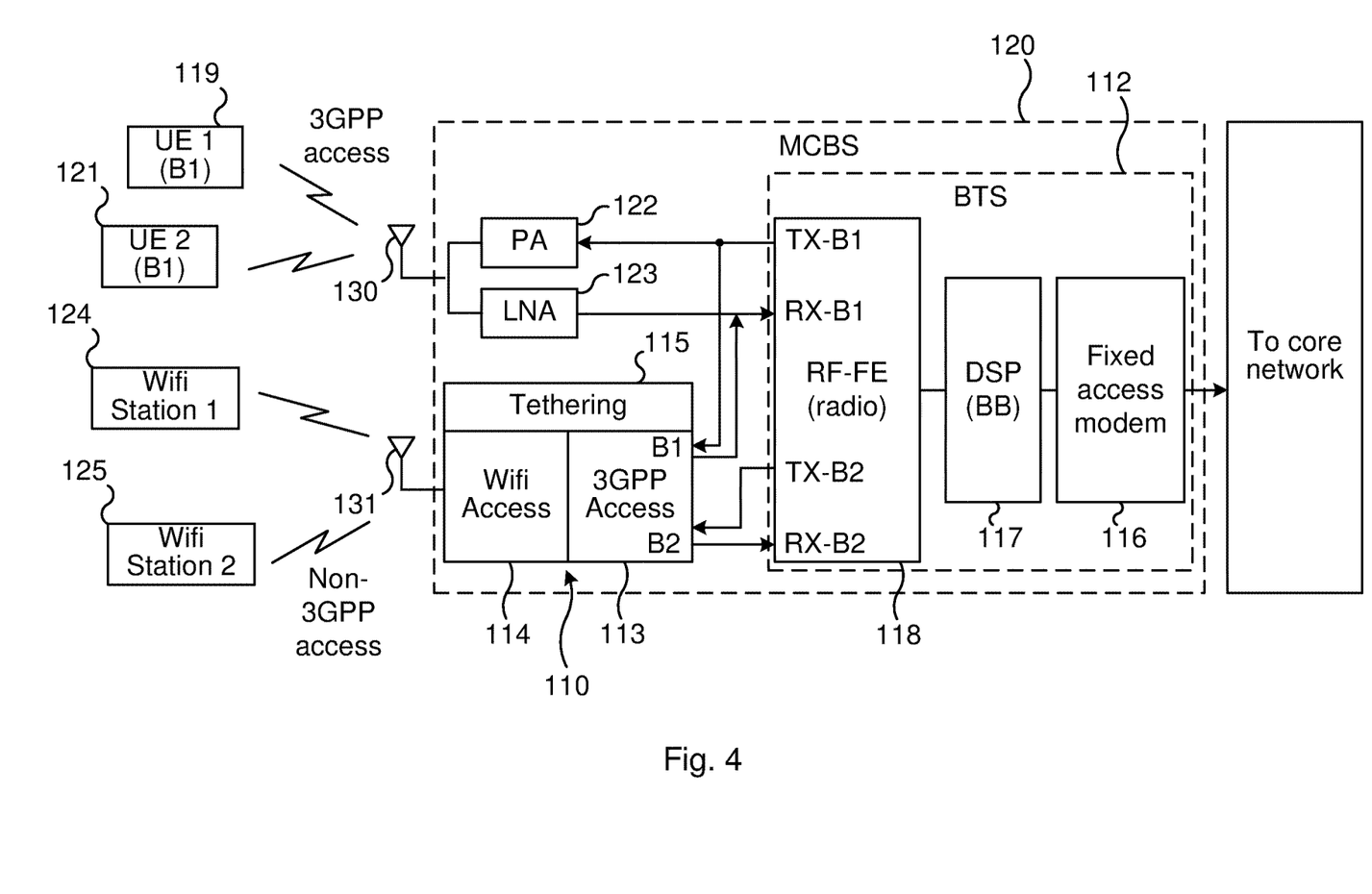
FIG. 4 illustrates a further embodiment of the invention, where the tethering AP is configured to share a 3GPP carrier with 3GPP UEs.

FIG. 4 illustrates a further embodiment of the invention, where the tethering AP 110 is configured to tap in to, and thus access, the carrier of the first band B1. For instance, when the residential traffic results in a higher load on the WiFi access than on the 3GPP access, the BTS 112 will advantageously schedule the traffic to the respective access type such that resources advantageously are scheduled on the carrier of the first band B1 to the tethering AP 110 for WiFi core network backhauling. Thus, the BTS 112 aggregates the carrier of the first band B1 and the carrier of the second band B2 such that both carriers can be used for WiFi backhauling.

In this example, the tethering AP 110 supports CA of the respective carrier in B1 and B2. Again, the first and second carrier need not necessarily be located in different bands, but intra-band CA can be envisaged.

Hence, the carrier in B2—i.e. the second carrier—is advantageously dedicated to the tethering AP 110, while the carrier in B1—i.e. the first carrier—is shared with regular home UEs connected over the air. This is implemented such that the tethering AP 110 taps out the downlink (DL) signal from the B1 carrier of the TX-B1 interface and taps in its uplink (UL) signal in the B1 carrier of the RX-B1 interface of the RF-FE 118 of the BTS 112.

As can be concluded, in both FIGS. 3 and 4, the WiFi backhauling is given the whole capacity of the B2 carrier (e.g. 150 Mbps for 20 MHz 2×2 MIMO). In the embodiment of FIG. 4, the WiFi backhauling capacity can further be increased to 300 Mbps with CA of the B1 and B2 carriers, if required. In such a case, the BTS 112 aggregates the first and the second carrier and schedules the tethering AP 110 to use some (or all) of the capacity of the first carrier.

Figure 5:
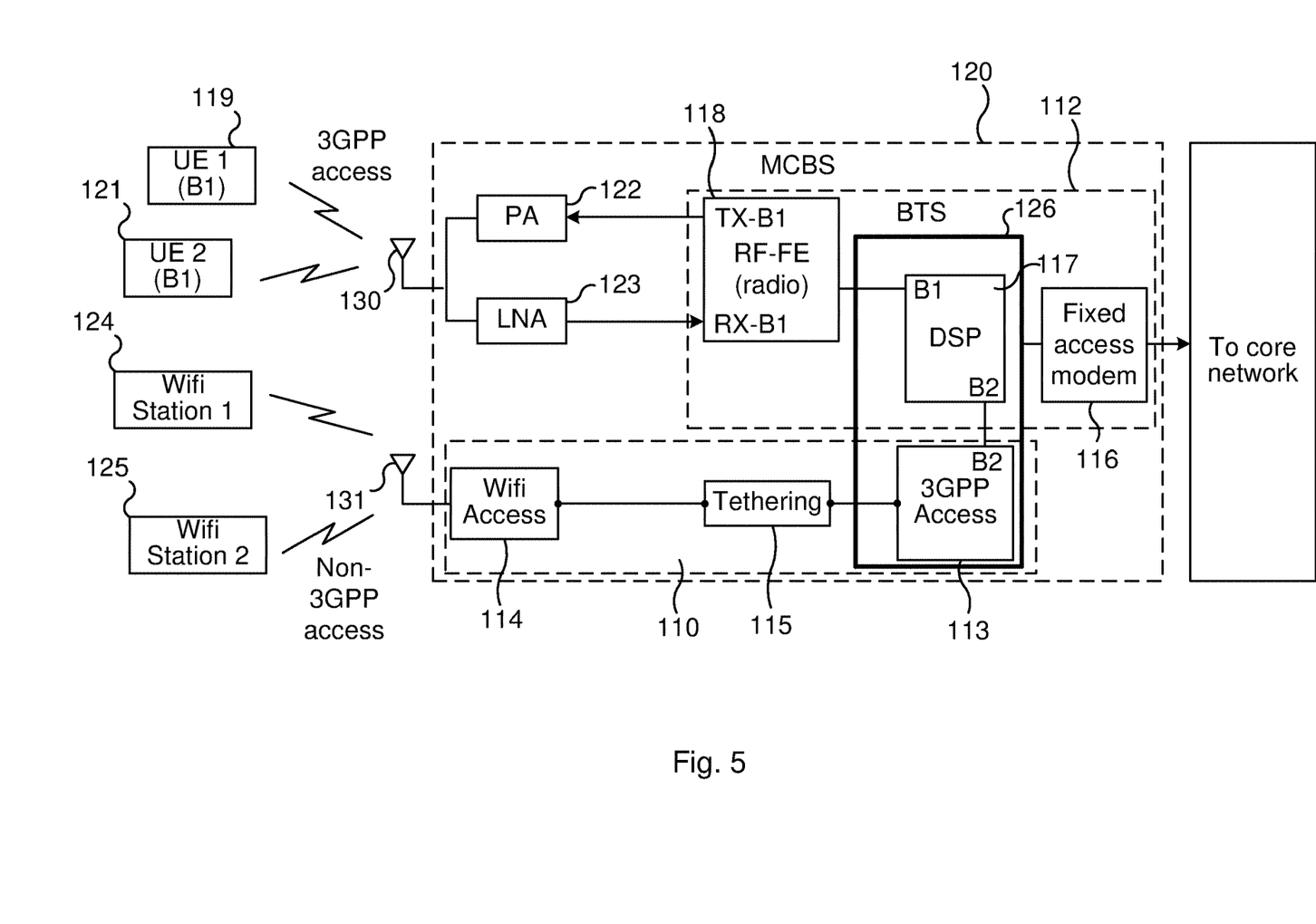
FIG. 5 shows still another embodiment of the invention, where the tethering AP is supplied with its carrier(s) at baseband.

FIG. 5 shows still another embodiment of the invention, where the tethering AP 110 is supplied via wired connection with its carrier (or carriers) at baseband from DSP 117 instead of at RF via the RF-FE 118.

In this embodiment, the 3GPP access module 113 of the tethering AP 110 is integrated with the DSP 117 of the BTS 112, e.g. in an Application Specific Integrated Circuit (ASIC) 126. The 3GPP module 113 will thus via wired connection exclusively receive the second carrier in B2 at baseband frequency and pass the second carrier at BB to the tethering module 115 and on to the WiFi access module 114 for shifting the second BB carrier to RF for provisioning of WiFi access to the first and second WiFi terminal 124, 125. Hence, core network backhaul signalling is provided with the second carrier (in the second band B2) between the 3GPP access module 113 and the DSP 117. It is envisaged that no part of the tethering AP 110 is integrated with the DSP 117, but that the tethering AP 110 still may receive the second carrier at baseband frequency from the DSP 117. It can further be envisaged that the complete tethering AP 110 is integrated with the DSP 117 in the ASIC 126.

As can be seen in FIG. 5, the RF-FE 118 of the BTS 112 is still used for shifting the frequency of the first carrier (in the first band B1) from BB to RF for providing 3GPP access to the first and second UE 119, 121 (via the PA 122 and the LNA 123).

Similar to the embodiment described with reference to FIG. 4, it can be envisaged that the 3GPP access module 113 of the tethering AP 112 taps in to the first carrier of B1 at baseband frequency, in order to share the first carrier with the UEs 119, 121 for backhaul signalling.

Figure 6:
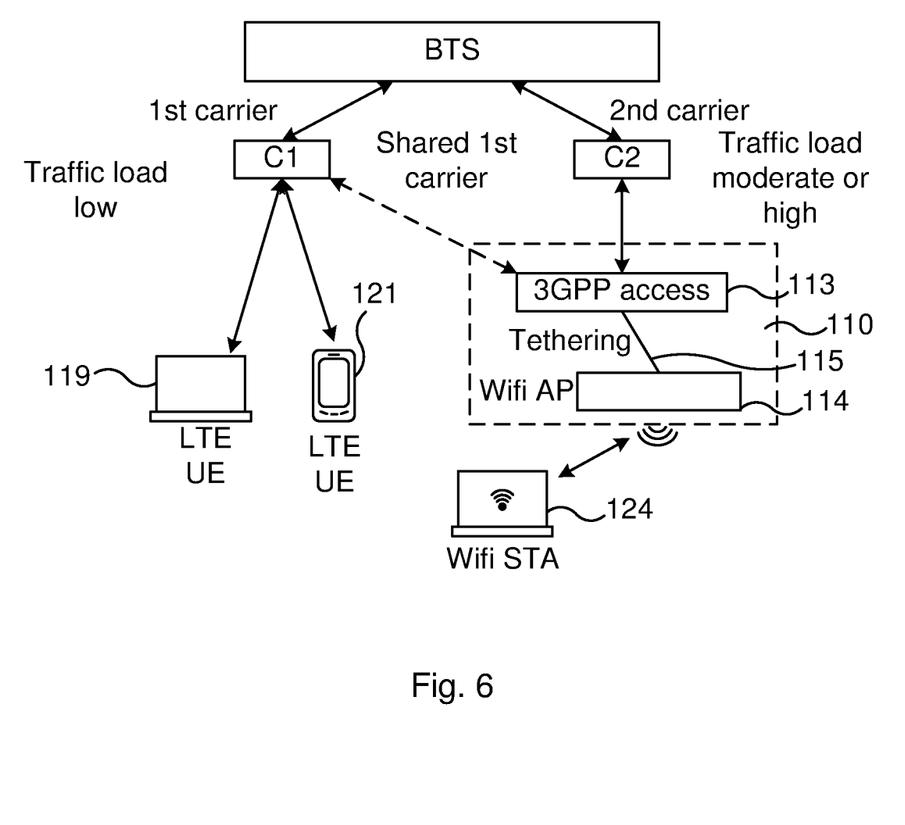
FIGS. 6-8 illustrate different traffic scenarios and the resulting scheduling of resources by the BTS according to embodiments.
Figure 7:
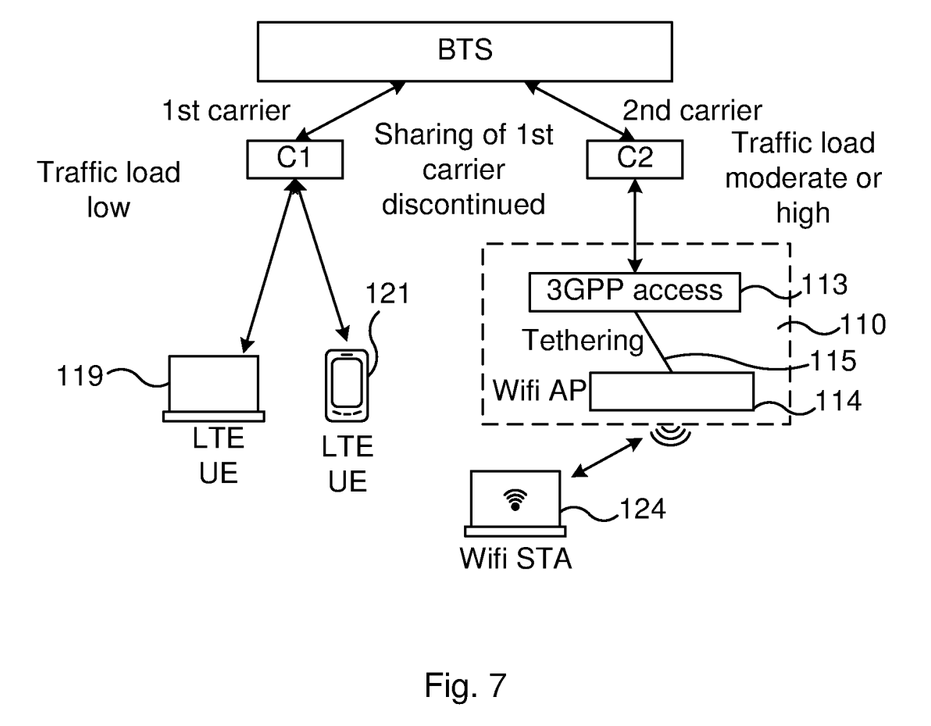
Figure 8:
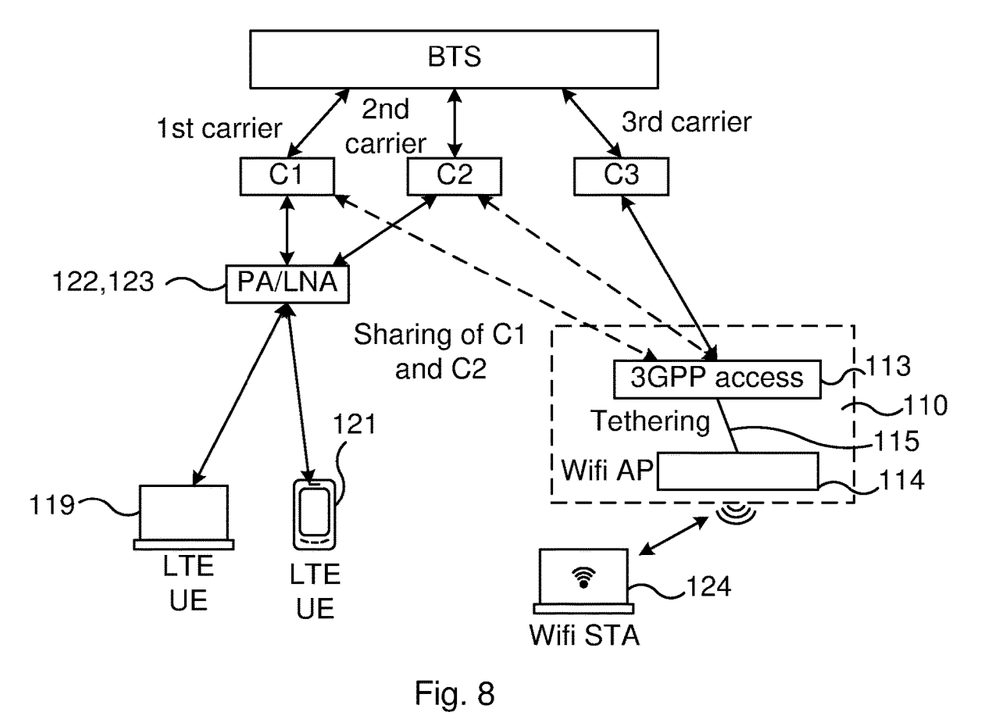

To conclude, FIGS. 6-8 illustrate different traffic scenarios and the resulting scheduling of resources as provided by the first carrier C1 and the second carrier C2, which may or may not operate in the same frequency band.

In FIG. 6, it is assumed that traffic load caused by 3GPP access (exemplified to be LTE access) is low, while the load caused by WiFi access is moderate to high. Consequently, the BTS 112 will schedule the first carrier C1 to be shared with the tethering AP 110 for core network backhaul signalling, while the second carrier C2 is still exclusively use by the tethering AP 110. Advantageously, since the capacity of the first carrier C1 is not fully utilized by the LTE UEs 119, 121, some of its capacity is scheduled to be used for the backhaul signalling of the tethering AP 110, thereby making better use of available capacity.

In FIG. 7, it is assumed that the traffic load caused by the LTE access of the UEs 119, 121 as well as the load caused by the WiFi access of the WiFi terminal 124 is high. Consequently, the BTS 112 will no longer schedule the first carrier C1 to be shared with the tethering AP 110 for core network backhaul signalling, and any sharing of the resource provided by the first carrier C1 is advantageously discontinued, at least temporarily until the traffic load situation has changed. Any core network backhaul signalling for the WiFi terminal 124 thus becomes exclusively carried by the second carrier C2.

The concept can be extended to further carriers as shown in FIG. 8. A number of carriers may be assigned in the same or different bands. The supported bandwidths may e.g. be 1.4, 3, 5, 10, 15 and 20 MHz (i.e. channel bandwidths of 4G LTE).

In FIG. 8, three carriers C1, C2 and C3 are used. In this particular exemplifying embodiment, the BTS 112 will schedule the first carrier C1 to be used for providing 3GPP communication with the UEs 119, 121 (via PA/LNA 122, 123) and to be shared with the tethering AP 110 for core network backhaul signalling, as indicated by one of the dashed arrows.

Further, the BTS 112 will schedule the second carrier C2 to be used for providing 3GPP communication with the UEs 119, 121 and to be shared with the tethering AP 110 for core network backhaul signalling, as indicated by the other one of the dashed arrows.

Finally, the BTS 112 schedules the third carrier C3 to be used exclusively by the tethering AP 110 for core network backhaul signalling. The BTS 112 may dynamically reschedule carrier capacity if deemed necessary.

A number of carrier aggregation approaches can be envisaged for aggregating capacity, such as intra-band contiguous, intra-band non-contiguous, or inter-band non-contiguous carrier aggregation.

It should be noted that the maximum bandwidth assigned for the tethering AP 110 generally is stipulated by the capacity of the fixed access medium provided to the BTS 112. The bandwidth of the fixed access medium (e.g. DSL or cable) forms a bottleneck and, the maximum bandwidth assigned to the tethering AP is less than or equal to fixed backhaul bandwidth minus the bandwidth provided to the UEs 119, 121 for 3GPP communication.

Figure 9:
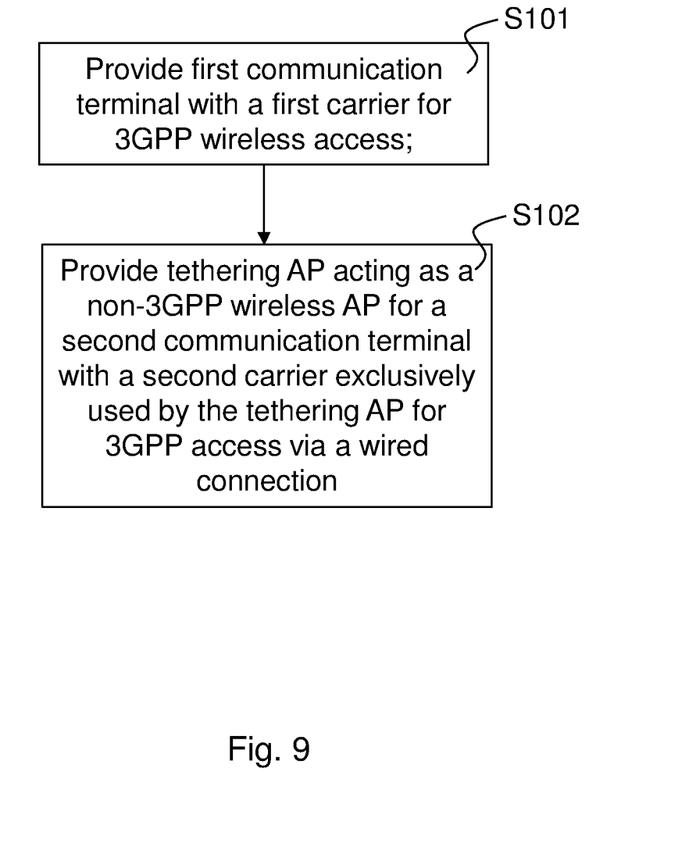
FIG. 9 illustrates a flowchart of a method according to an embodiment.

FIG. 9 shows a flowchart of a method according to an embodiment. Reference is further made to FIG. 3 for structural elements.

Now, when the MCSB 120 provides wireless access to first and second UEs 119, 121 and to first and second WiFi terminals 124, 125 via a single or both antennas 130, 131, at least two carriers will be established by the BTS 112.

In a first step S101, the first and second UEs 119, 121 is provided with a first carrier or 3GPP wireless access. As can e seen in FIG. 3, signals to/from the first and second UEs 119, 121, generally need to be amplified in the transmit path by the PA 122 and in the receive path by the LNA 123.

Further, in a second step S102, the tethering AP 110 is provided, via a wired connection to the BTS 112, with a second carrier for 3GPP access. The second carrier is not transmitted over an air interface and is thus exclusively used by the tethering AP 110, which serves as a non-3GPP wireless access point for the first and second WiFi terminals 124, 125.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed at a multi-carrier base station configured to enable wireless access to wireless communication terminals, comprising:
providing a first set of the wireless communication terminals with at least a first carrier for Third Generation Partnership Project, 3GPP, wireless access; and
dedicating, by a cellular base transceiver station, BTS, of the multi-carrier base station to a tethering access point via a wired connection, at least a second carrier for exclusive use by the tethering access point to access the cellular BTS for 3GPP access,
the tethering access point being configured to act as a non-3GPP wireless access point for a second set of the wireless communication terminals by bridging between 3GPP access and non-3GPP access;
the tethering access point further being configured to be perceived by the cellular BTS as a 3GPP wireless communication terminal; and
a scheduler of the cellular BTS being configured to assign a default bearer service to the tethering access point, wherein the default bearer service is one of a plurality of bearer services of the second carrier.

2. The method of claim 1, further comprising:
providing the tethering access point with said at least a first carrier for 3GPP access, wherein at least part of capacity of the at least a first carrier is shared between the tethering access point and the first set of the wireless communication terminals.

3. The method of claim 1, the provision of the at least a first carrier further comprising:
providing the at least a first carrier via a radio frequency front end of the multi-carrier base station.

4. The method of claim 1, the provision of the at least a first carrier further comprising:
providing the at least a first carrier to the first set of the wireless communication terminals via a radio frequency front end of the multi-carrier base station.

5. A device configured to provide wireless communication access to wireless communication terminals, the device comprising:
a cellular base transceiver station, BTS, configured to be connectable to a core network;
a tethering access point;
at least one antenna;
the cellular BTS being configured to provide a first set of the wireless communication terminals with at least a first carrier via the at least one antenna for Third Generation Partnership Project, 3GPP, wireless access;
the cellular BTS further being configured to dedicate, to the tethering access point via a wired connection, at least a second carrier for exclusive use by the tethering access point to access the cellular BTS for 3GPP access;
the tethering access point being configured to provide a second set of the wireless communication terminals with non-3GPP wireless access via the at least one antenna by bridging between 3GPP access and non-3GPP access;
the tethering access point further being configured to be perceived by the cellular BTS as a 3GPP wireless communication terminal; and
a scheduler of the cellular BTS being configured to assign a default bearer service to the tethering access point, wherein the default bearer service is one of a plurality of bearer services of the second carrier.

6. The device of claim 5, the cellular BTS comprising:
a modem configured to be connectable to the core network;
a processing unit configured to process baseband signals received from, and transmitted to, the modem; and
a radio frequency front end, RF-FE, module configured to convert said at least a first and a second carrier at baseband received from the processing unit to radio frequency and further to convert said at least a first and a second carrier at radio frequency into baseband to be sent to the processing unit.

7. The device of claim 5, the cellular BTS comprising:
a modem configured to be connectable to the core network;
a processing unit configured to process baseband signals received from, and transmitted to, the modem, and further to provide the tethering access point with said at least a second carrier at baseband; and a radio frequency front end, RF-FE, module configured to convert said at least a first carrier at baseband received from the processing unit to radio frequency and further to convert said at least a first carrier at radio frequency into baseband to be sent to the processing unit.

8. The device of claim 7, the tethering access point further being configured to:
convert said at least a second carrier at baseband received from the processing unit to radio frequency and further to convert said at least a second carrier at radio frequency into baseband to be sent to the processing unit.

9. The device of claim 6, the tethering access point comprising:
a 3GPP access module configured to receive said at least a second carrier;
a non-3GPP access module configured to provide non-3GPP wireless access to the second set of wireless communication terminals via the at least one antenna; and
a tethering module to provide connectivity between the 3GPP access module and the non-3GPP access module for tethering the second set of wireless communication terminals to the tethering access point.

10. The device of claim 9, wherein at least the 3GPP access module of the tethering access point is implemented within the processing unit.

11. The device of claim 5, the tethering access point further being configured to:
receive said at least a first carrier for 3GPP access, wherein at least part of capacity of the at least a first carrier is shared between the tethering access point and the first set of the wireless communication terminals.

12. The device of claim 5, further comprising:
a power amplifier arranged in a transmit path configured to amplify signals to the first set of wireless communication terminals; and
a low noise amplifier arranged in a receive path configured to amplify signals from the first set of wireless communication terminals.

13. A non-transitory computer-readable storage medium comprising a computer program product including instructions to cause at least one processor to:
provide a first set of wireless communication terminals with at least a first carrier for Third Generation Partnership Project, 3GPP, wireless access;
by a cellular base transceiver station, BTS, of a multi-carrier base station to a tethering access point via a wired connection, at least a second carrier for exclusive use by the tethering access point to access the cellular BTS for 3GPP access, the tethering access point being configured to act as a non-3GPP wireless access point for a second set of wireless communication terminals by bridging between 3GPP access and non-3GPP access,
the tethering access point further being configured to be perceived by the cellular BTS as a 3GPP wireless communication terminal; and
assign, by a scheduler of the cellular BTS, a default bearer service to the tethering access point, wherein the default bearer service is one of a plurality of bearer services of the second carrier.

\* \* \* \* \*